(12) United States Patent
Kurtz

(10) Patent No.: US 7,673,518 B2
(45) Date of Patent: Mar. 9, 2010

(54) COMPACT ABSOLUTE AND GAGE PRESSURE TRANSDUCER HAVING A MOUNTING APPARATUS FOR ACCURATELY POSITIONING AND ALIGNING A LEADLESS SEMICONDUCTOR CHIP ON AN ASSOCIATED HEADER

(75) Inventor: Anthony D. Kurtz, Saddle River, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 12/214,507

(22) Filed: Jun. 19, 2008

(65) Prior Publication Data

US 2009/0314094 A1    Dec. 24, 2009

(51) Int. Cl.
*G01L 13/02*    (2006.01)
(52) U.S. Cl. .......................................... 73/716; 257/414
(58) Field of Classification Search .................... 73/716, 73/736; 257/414, 419
See application file for complete search history.

(56) References Cited

U.S. PATENT DOCUMENTS

| 4,222,277 | A | 9/1980 | Kurtz et al. |
| 5,955,771 | A | 9/1999 | Kurtz et al. |
| 6,612,179 | B1 | 9/2003 | Kurtz |
| 6,997,059 | B2 * | 2/2006 | Ernsberger et al. ............. 73/753 |
| 7,057,247 | B2 * | 6/2006 | Kurtz et al. .................. 257/419 |
| 7,107,853 | B2 | 9/2006 | Kurtz |
| 2003/0107096 | A1 * | 6/2003 | Kurtz et al. .................. 257/414 |
| 2004/0187588 | A1 * | 9/2004 | Miyazawa .................... 73/716 |
| 2005/0072245 | A1 * | 4/2005 | Ernsberger et al. ............. 73/753 |

FOREIGN PATENT DOCUMENTS

WO    WO 2008122134 A1 * 10/2008

* cited by examiner

*Primary Examiner*—Andre J Allen
(74) *Attorney, Agent, or Firm*—Troutman Sanders LLP; James E. Schutz; Filip A. Kowalewski

(57) ABSTRACT

A compact absolute and gage pressure transducer consists of two sensors made from the same silicon wafer and adjacent each other on the wafer. The transducer contains a common header with a first and a second input port for receiving a first and a second pressure, respectively. The second port is directed through a reference tube into the hollow of a housing to apply pressure from the reference tube to the common sensor arrangement. The first port is directed from another surface of the housing to direct pressure to both sensor devices. One sensor operates as a gage sensor producing an output proportional to the difference between input pressures and the other sensor produces an absolute output. The sensor chip is associated with a sensor header which includes an alignment pin extending therefrom, and a guide plate with an aperture for accommodating an alignment pin.

20 Claims, 4 Drawing Sheets

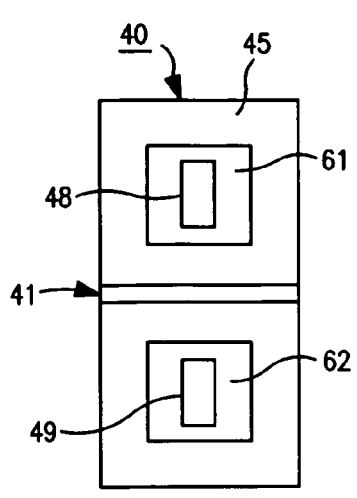
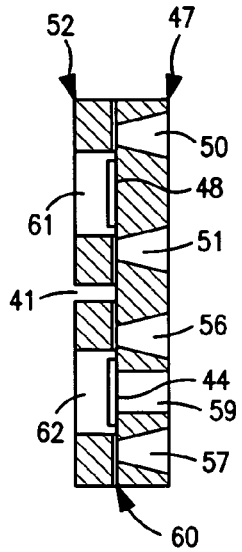
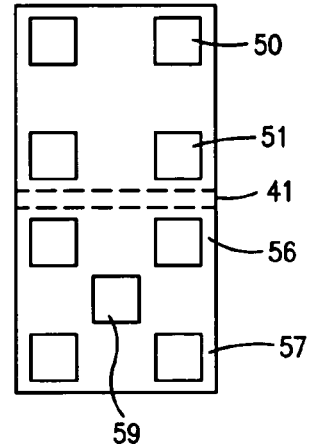
FIG. 2A  FIG. 2B  FIG. 2C
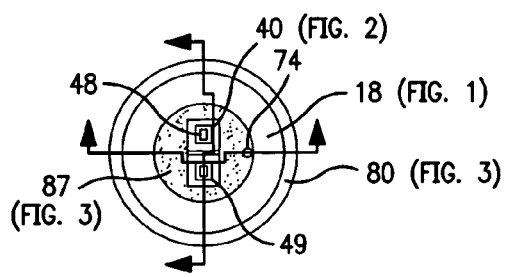
FIG. 4A
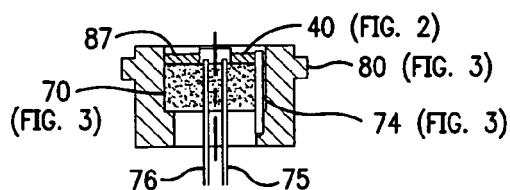
FIG. 4B
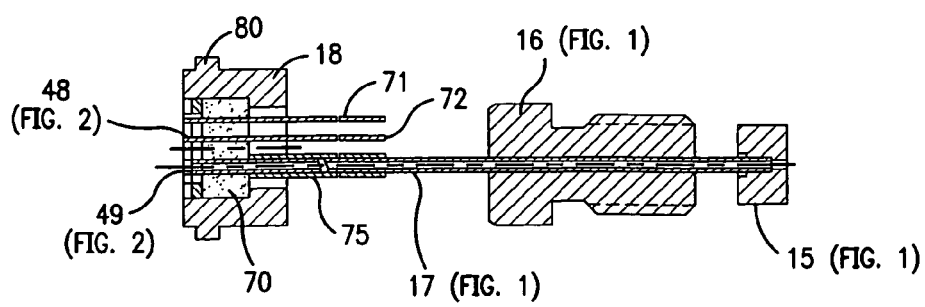
FIG. 5

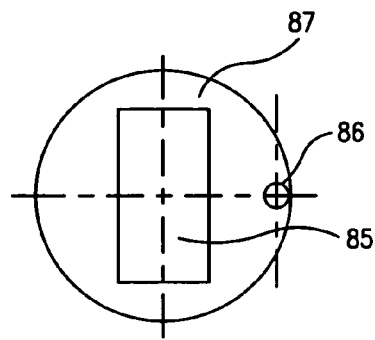
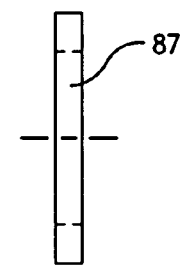
FIG. 6A  FIG. 6B
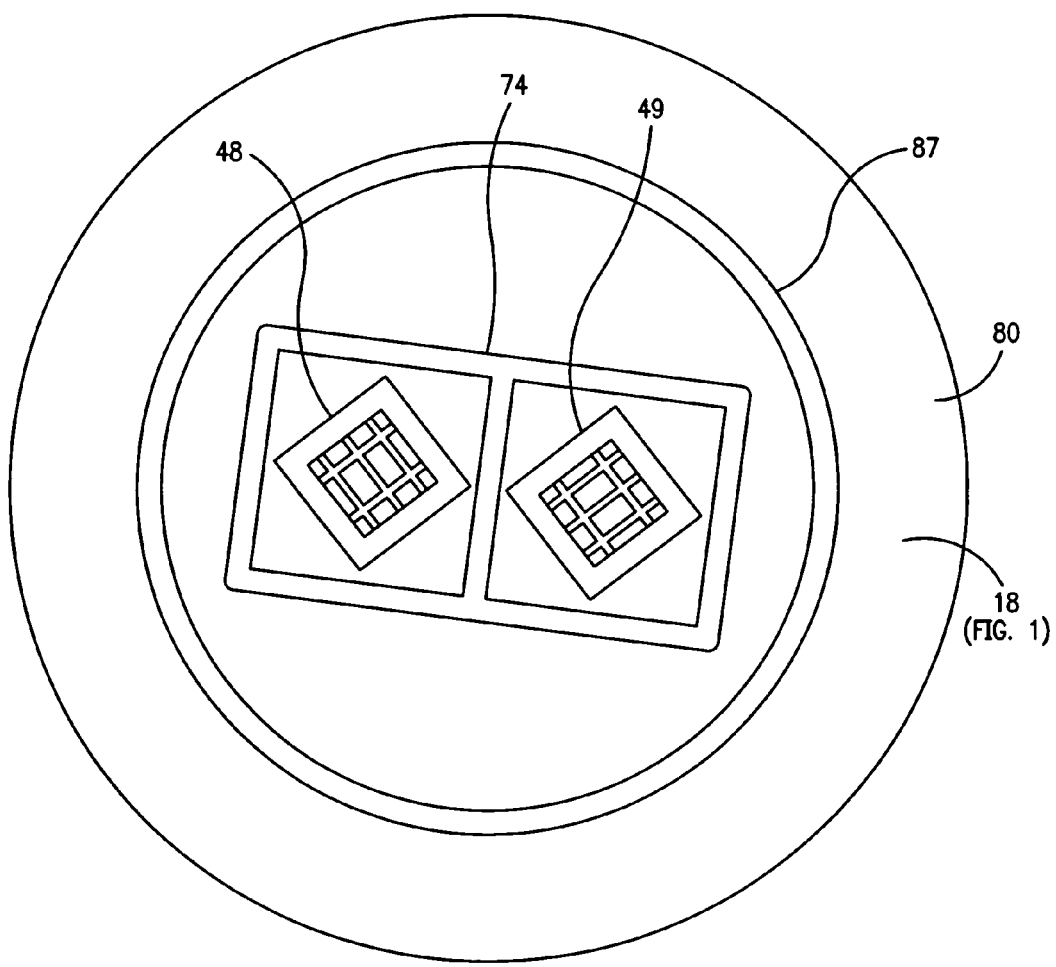
FIG. 7

COMPACT ABSOLUTE AND GAGE PRESSURE TRANSDUCER HAVING A MOUNTING APPARATUS FOR ACCURATELY POSITIONING AND ALIGNING A LEADLESS SEMICONDUCTOR CHIP ON AN ASSOCIATED HEADER

FIELD OF THE INVENTION

This invention relates to a gage or differential and absolute transducer contained in a single housing.

BACKGROUND OF THE INVENTION

The piezoresistor sensor has been used in many applications to measure pressure or force. The assignee herein, namely Kulite Semiconductor Products, Inc. holds over 150 patents on pressure sensor design and the technology is well known. In regard to such pursuits, it has been determined that there is a need for a compact and economical absolute and gage pressure transducer. Such transducers can be utilized in the automobile industry, as well as many other industries. As one can ascertain, these devices have to be reliable and extremely economical. Furthermore, the devices have to be compact in order to take up less room and consume less power. As one can ascertain in the automotive industry, pressure transducers are employed to measure the pressure of various engine fluids and to measure the pressure at the manifold and so on. The devices have to be extremely reliable. As one can understand, differential pressure measurements can be accomplished by a differential transducer which provides an output which is the difference between two input pressures. In the case of a gage sensor, one of these pressures is atmospheric pressure and the other pressure is the pressure being monitored. Essentially a gage transducer provides an output which is the difference between atmospheric pressure and the monitored pressure. In the case of the absolute pressure transducer, the output is indicative of monitored pressure.

As one can ascertain from the prior art, such devices exist while there can be many problems. One typical problem, in the case of an absolute transducer, is that it is difficult using standard integrated circuit chip fabrication and packaging techniques to form a reference pressure on the circuit side of the sensing diaphragm. Other configurations are deficient in that there has to be extreme care in positioning the piezoresistive sensing device in the package so that it is properly aligned in order to receive the common input pressures. This has been a difficult job and requires an experienced assembly technician to align the integrated circuit chip within the housing so that the optimum pressures can be applied to the chip. Other problems exist in regard to the difficulty of providing a compact device which will also be rugged and reliable. As one can ascertain, the smaller one makes the device, the more difficult it is to operate the same and to construct the same in a reliable manner. In any event, the prior art is replete with the number of patents which describe absolute and gage sensors.

For example, reference is made to U.S. Pat. No. 4,222,277 issued on Sep. 16, 1980 to A. D. Kurtz, et al. and entitled Media Compatible Pressure Transducer. This patent is assigned to Kulite Semiconductor Products, Inc., the assignee herein. As one can ascertain, that patent discloses an absolute and gage pressure transducer which are contained on a single wafer, where the wafer contains a gage sensing configuration on one portion and an absolute sensor configuration on the other portion. In any event, the device depicted responds to and produces an output proportional to both absolute and to gage pressure.

Reference is also made to U.S. Pat. No. 5,955,771 entitled Sensors for Use in High Vibrational Applications and Methods for Fabricating Same issued on Sep. 21, 1999 to A. D. Kurtz, et al. and assigned to Kulite Semiconductor Products, Inc., the assignee herein. That patent is pertinent as it shows a technique for fabricating semiconductor devices which are designated as leadless devices and which devices can be utilized in the invention to be described.

In regard to absolute differential pressure devices reference is made to U.S. Pat. No. 6,612,179 entitled Method and Apparatus for the Determination of Absolute Pressure and Differential Pressure Therefrom. That patent was issued on Sep. 2, 2003 to A. D. Kurtz, the inventor herein and assigned to Kulite Semiconductor Products, Inc. The patent describes a combination of absolute and differential pressure sensing devices or transducers, where each transducer includes a plurality of a half bridge structure and a device for selectively coupling one half bridge structure of one absolute pressure transducer to at least one resistor. As one can see, the patent describes in detail the device employed as well as showing the wafer and glass supporting members. As well can be explained and seen in FIGS. 7A and 7B the device has similar attributes to the device to be described herein.

Also reference is made to U.S. Pat. No. 7,057,247 issued on Jun. 6, 2006 to A. D. Kurtz, et al. and assigned to Kulite Semiconductor Products, Inc. and entitled Combined Absolute Differential Transducer. This patent discloses a combined absolute and differential pressure transducer which consists of two sensors made from the same wafer of silicon and selected to be adjacent to each other on the wafer. As one can ascertain from reviewing the patent, which has nineteen Figures, the device depicted therein provides a relatively inexpensive structure which is capable of measuring both absolute and differential pressures.

References also made to U.S. Pat. No. 7,107,853 entitled Pressure Transducer for Measuring Low Dynamic Pressures in the Presence of High Static Pressures issued on Sep. 19, 2006 to A. D. Kurtz, the inventor herein, and assigned to Kulite Semiconductor Products, Inc., the assignee herein. In that patent a sensor is described which consists of a leadless high sensitivity differential chip which responds to both static and dynamic pressure. Located on the transducer are two sensors. One sensor has a thicker diaphragm and responds to both static and dynamic pressure to produce an output indicative of essentially static pressure. The other sensor has a thinner diaphragm as one side or surface responds to both static and dynamic pressure. The other side of the differential sensor has a reference tube coupled to the bottom of the diaphragm. The tube only allows static pressure to be applied to the underside of the diaphragm. In any event, as one can see from the structure a single chip is employed. In any event, in view of the above, as one can ascertain, there are many patents which exist in the prior art which show the absolute and differential gage pressure transducers employing a single chip having two sensor circuits located on the chip and employing various header designs. As indicated above, it is a problem in regard to such prior art devices to accurately fabricate the device so that the chip is in proper alignment with respect to the pressure ports and that the device is compact and capable of being quickly and reliably assembled. It is an object of the present invention to provide a compact absolute and gage pressure transducer having these features.

SUMMARY OF THE INVENTION

A pressure transducer, comprising: a housing having an internal hollow and having a first pressure port for receiving a first pressure ($P_1$) and a second pressure port for receiving a second pressure ($P_2$), said housing having a pressure sensor header accommodating area within said hollow, a pressure sensor header having an outer shell with a semiconductor sensor chip accommodated in said shell, said chip containing first and second pressure sensing modules fabricated from a common wafer process, each module containing contacts connected to said sensor module, said chip mounted on a glass header within said shell, said header having terminal pins connected to said module contacts, said glass header further including a guide pin extending from said header and positioned within said shell to properly align said chip when placed in said shell assuring that said module contacts and said terminal pins properly align to make electrical contact, said shell positioned within the hollow of said housing according to the location of said guide pin to enable said first and second pressure sensing modules to receive said first pressure, and means coupled to said second pressure port to direct said second pressure to only one of said modules to cause said module to provide an output proportional to the difference between said first and second pressure, with said other module providing an output proportional to said first pressure.

BRIEF DESCRIPTION OF THE FIGURES

FIG. 2 consists of FIG. 2A, FIG. 2B and FIG. 2C. FIG. 2A depicts a top view of a semiconductor chip according to this invention. FIG. 2B depicts a cross-sectional view of the chip shown in FIG. 2A. FIG. 2C depicts a bottom view of the chip of FIG. 2A.

FIG. 3 consists of FIG. 3A, FIG. 3B and FIG. 3C.

FIG. 4 consists of FIG. 4A and FIG. 4B. FIG. 4A is a top view of the header of FIG. 3A employing a semiconductor chip. FIG. 4B is a cross-sectional view taken through line A-A of FIG. 4A.

FIG. 5 is a cross-sectional view depicting the semiconductor chip and header including the reference tube and various components used to fabricate the device.

FIG. 6 consists of FIG. 6A and FIG. 6B and shows a glass guide plate utilized with this invention. FIG. 6B shows a side view of the glass guide plate shown in FIG. 6A as a top view.

FIG. 7A shows a enlarged depiction of a semiconductor chip employing two sensor arrangements according to this invention.

DETAILED DESCRIPTION OF THE FIGURES

Figure 1:
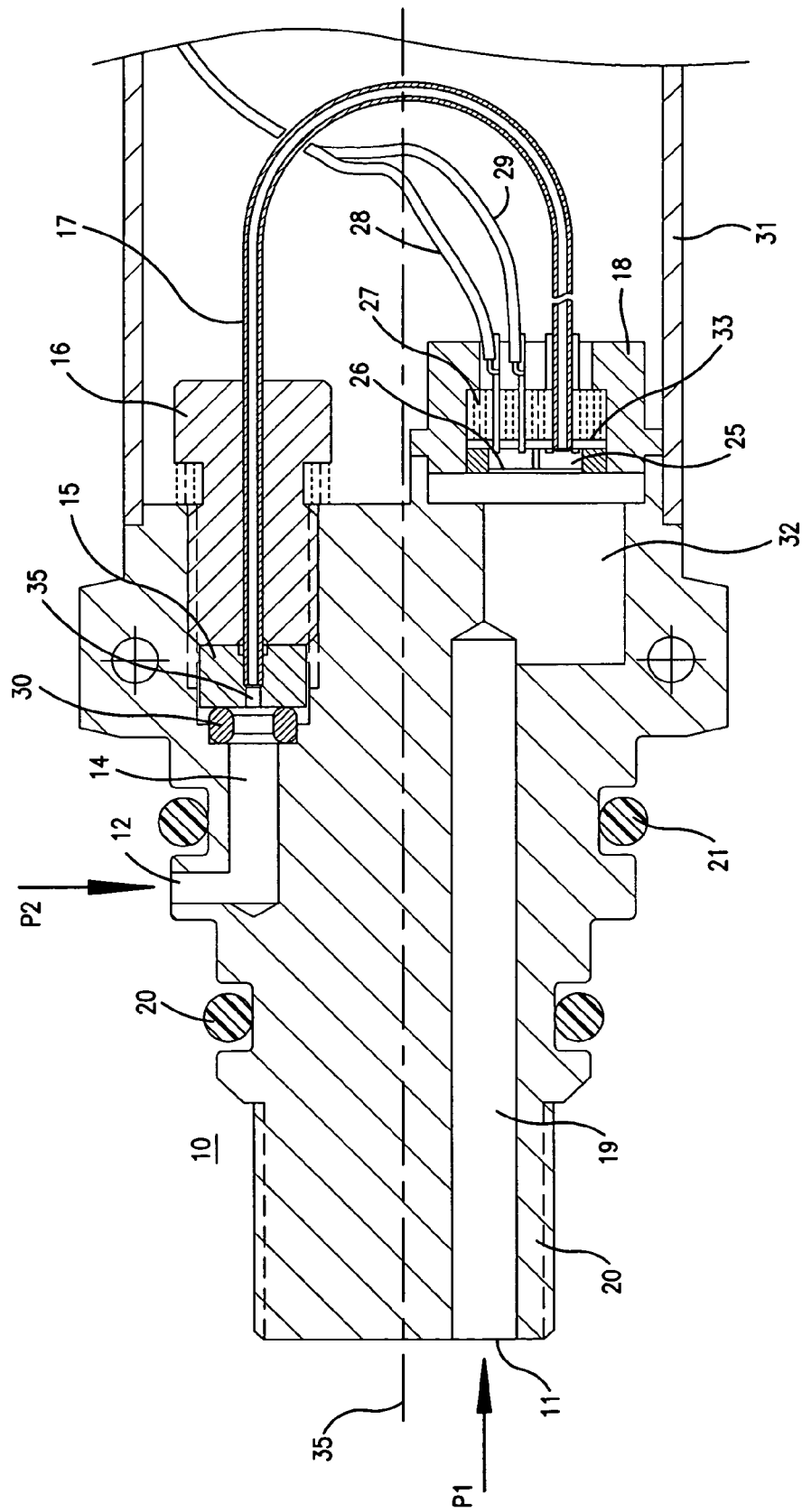
FIG. 1 depicts a cross-sectional view of a header according to the present invention.

Referring to FIG. 1 there is shown a cross-sectional view of a metallic housing 10. The housing 10 basically has a front section 20 which is coupled to a rear section 31. The rear section 31 can be welded to the front section. In any event, the header has a first input port 11 which is adapted to receive a pressure $P_1$ and a second input port 12 which is adapted to receive a pressure $P_2$. The second input port has a first portion which is transverse to a main channel 14. The main channel 14, as will be explained, communicates with a reference tube 17 to basically direct the pressure at port 12 or the $P_2$ pressure to the underside of one of two sensing diaphragms as sensors 25 and 26 contained in a sensor header 18, these will be described in greater detail. As one can ascertain, the header 10 shown in FIG. 1 is compact. The pressure $P_1$ is directed through channel 19 into hollow 32, which hollow 32 communicates with the top side of each sensor 25 and 26. Each sensor, as will be further explained, has a deflecting diaphragm associated therewith. Hence, both sensors 25 and 26 receive the pressure $P_1$. The pressure $P_2$, as applied by the reference tube 17 is applied to the underside of the diaphragm associated with sensor 25. Therefore, sensor 25 receives the pressure $P_1$ on the top side and pressure $P_2$ on bottom side. This will cause the diaphragm to deflect and produce an output equal to $P_1$-$P_2$. If $P_2$, for example, is atmospheric pressure, the sensor 25 will produce an output designated as gage pressure which basically is the pressure $P_1$—atmospheric pressure. The sensor 26 on the other hand, only receives pressure $P_1$ and therefore produces an output proportional to pressure $P_1$, and hence serves as an absolute transducer device. As seen in FIG. 1, the header 10 is quite compact and extremely rugged. The input pressure $P_2$, as indicated is directed through port 12 and hence, through channel 14 which is transverse with respect to the input channel. Channel 14 is directed to a hollow which contains a spacer 30 and then to the input 35 of the reference tube 17. The reference tube is held firmly in place against the spacer 30 by means of the ferrule 15 and a locknut 16. The locknut 16 has an internal aperture through which the reference tube is directed. The reference tube, as indicated, goes into the sensor housing 18 associated with the sensors 25 and 26 and communicates with the underside of the diaphragm associated with sensor 25. The reference tube 17 also passes through a glass header 27, as will be explained. Each of the sensors 25 and 26 have terminal pins which are directed to suitable wires as 28 and 29, all of which is well known. In any event, the header 10 also has suitable gaskets as 20 and 21 to enable the header to be securely mounted in an aperture or on some other platform. The header is similar to many existing headers that have the above noted advantages and as will be explained, the devices depicted form a compact absolute and gage pressure transducer which is economical to fabricate and easy to assemble.

Referring to FIG. 2 there is shown in FIG. 2A a top view of the sensor assembly and in FIG. 2B a cross-sectional side view of the sensor assembly and in FIG. 2C a bottom view of the sensor assembly. This sensor assembly, referring back to FIG. 1 is indicative of the sensors 25 and 26 shown in FIG. 1, which as will be further explained, are eventually coupled to a guide glass 33 and a header glass 27. The sensors shown in FIG. 2 are essentially the same sensors depicted in U.S. Pat. No. 7,057,247 entitled Combined Absolute Differential Transducer, as will be explained, there are certain differences but the sensors depicted in FIG. 2 basically consist of two leadless piezoresistive sensors which are made from the same wafer of silicon and are chosen to be adjacent to each on the wafer. This is described in detail in the above noted patent which is incorporated herein in its entirety. As will be indicated, there are certain exceptions. As seen in FIG. 2A, the top sensor 48 will function as the absolute sensor and the sensor 48, for example, contains a Wheatstone bridge array as depicted in the above noted patent and which array is also fabricated in accordance with U.S. Pat. No. 5,955,771 entitled Sensors for Use in High Vibrational Applications and Methods for Fabricating Same issued on Sep. 21, 1999 to A. D. Kurtz, et al. The present pressure transducer basically consists of the two leadless piezoresistive sensor devices, as for example, 48 and 49, which are fabricated on the same chip in accordance to the teachings of U.S. Pat. No. 5,955,771 which is incorporated herein in its entirety. By choosing adjacent sensors with the same web thickness, both the thermal shift and the thermal sensitivity shift are controlled by the impurity concentrations of the P+ regions and by how well they match other. Thus, the thermal properties of the two individual sensors can be more closely controlled and match each other, resulting in a better overall combined absolute-differential transducer. The two sensors may be used in a single attached body and thus mounted in a single operation, although they can also be cut apart and mounted separately. In any event, the sensor assembly 40, as seen in FIG. 2A is rectangular in shape. It has first and second aperture as 61 and 61 which communicate with the silicon sensor assemblies 48 and 49. The apertures as 61 and 62 allow a pressure to be applied to the top side of the sensors. As seen, sandwiched between the cover glass 62 and the compact glass 47 is a silicon wafer 60. The silicon wafer 60 contains the bridge configurations as 48 and 49, which are seen in FIG. 2B communicating with apertures 61 and 62 and the top surface of the cover glass 62. Bonded to the underside of the silicon wafer is a contact glass wafer 47. The contact glass wafer 47 has contact apertures 50, 51, 56 and 57. These contact apertures essentially make contact with the contact areas on the semiconductor chip. These apertures as 50, 51, 56 and 57 are eventually filled with a conductive glass frit, which is preferably a mixture of gold and glass frit. It is preferred that the glass frit is made with PYROCERAM, a glass material manufactured by Corning Glass Company. The PYROCERAM glass frit is prepared by mixing the finely powered glass and gold with a suitable suspension vehicle such as a mixture of nitrocellane in anylacerate to a desired consistency to form a base like mixture of gold and glass frit. Thus, filling these apertures enables one to make contact via the apertures and via the conductive frit to the terminals on the silicon chip 60 associated with the bridge. As seen in FIG. 2C there is shown the contact apertures as 50, 51, 56 and 57 associated with the contact glass 47. Thus as one can see and as will be understood, the above noted structure shown in FIG. 2 is fabricated as the structures depicted in U.S. Pat. No. 6,612,179 and also fabricated according to structure shown in U.S. Pat. No. 5,955,771 both of which are incorporated herein. As one will also ascertain, the bonding of the glass layers to the silicon sensor is accomplished by the techniques depicted in U.S. Pat. No. 5,286,671 entitled Fusion Bonding Technique for Use in Fabricating Semiconductor Devices issued on Feb. 15, 1994 to A. D. Kurtz, et al. and assigned to Kulite Semiconductor Products, Inc. It is thus seen that the chip as shown is rectangular in shape although other geometrical configurations can be used as well. It is also noted in FIG. 2C that there is a gage hole 59 associated with the semiconductor chip 49. As seen, there is no gage hole associated with semiconductor chip 48. The semiconductor chip 48 functions as the absolute sensor while chip 49 functions as the gage or differential sensor. As indicated, this is well known and described in the above noted U.S. Pat. No. 7,057,247. Referring to FIGS. 2A and 2B there is shown an isolation groove 41. The groove 41 is made through the cover glass 52 and through the semiconductor or silicon wafer 60. The groove 41 prevents current flow or coupling between sensor bridges 48 and 49 thus electrically isolating the same.

Figure 3A:
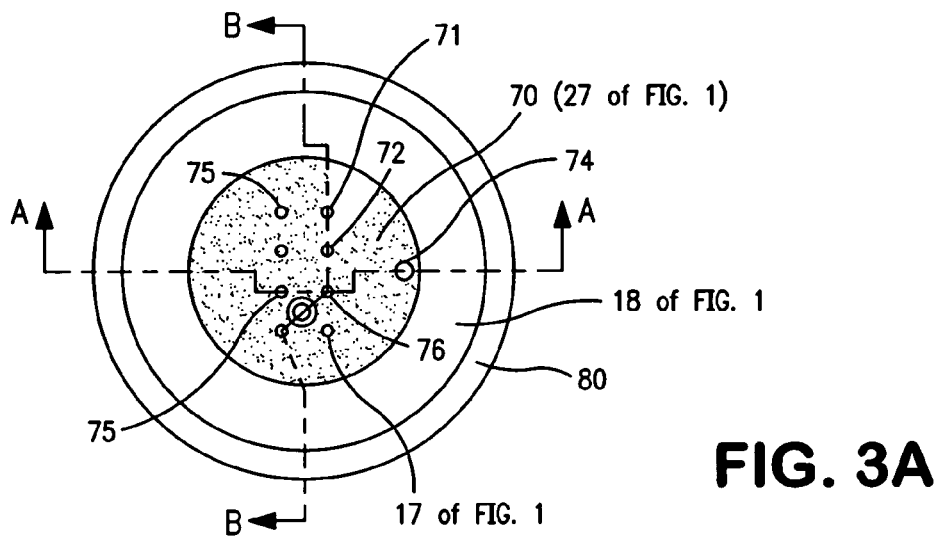
FIG. 3A depicts a top view of a header employing a glass member according to this invention.
Figure 3B:
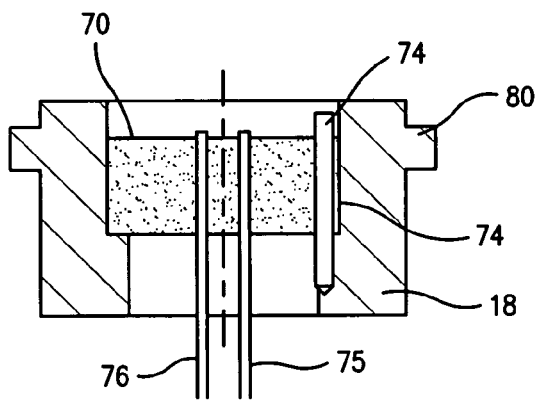
FIG. 3B depicts a view taken through line B-B of FIG. 3A.
Figure 3C:
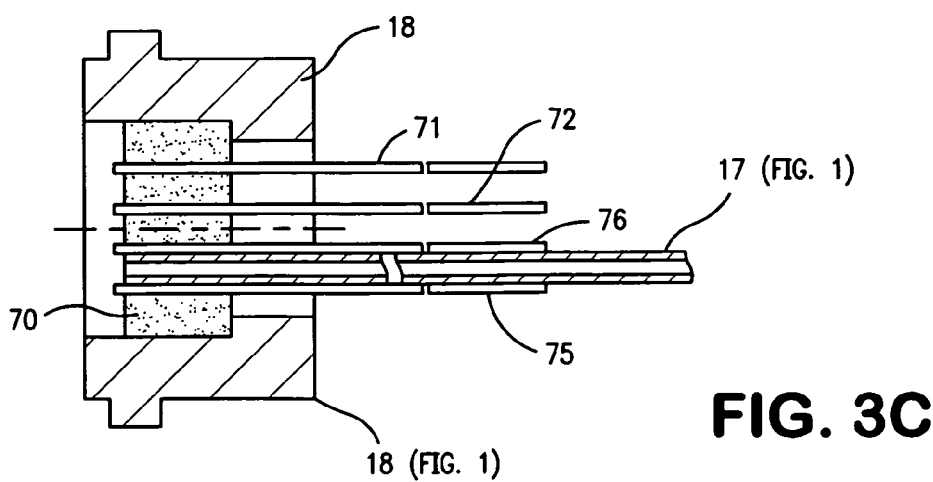
FIG. 3C depicts a view of the header taken through line B-B of FIG. 3A.

Referring to FIG. 3 there is shown FIG. 3A which is a top view of the header 18 depicted in FIG. 1. FIG. 3B is a sectional view taken through line A-A of FIG. 3A while FIG. 3C is a sectional view taken through line B-B of FIG. 3A. As seen in FIG. 3A, the top view of the header is basically circular and has a peripheral flange 80. Positioned in the center of the header is a header glass member 70 which is equivalent to 27 of FIG. 1. The header glass 70 has a plurality of pins extending from the top surface as pins 71, 72, 75, 76 and 78. These pins are seen in FIG. 3B extend through the glass header and extend slightly above the top surface of the glass header. Based on the pattern shown in FIG. 3A, when a chip shown in FIG. 2 is placed properly on the header, the conductive contacts which are associated with apertures 50, 51 and so on, will make direct contact with the terminals as 75 and 76 associated with the glass header. As seen, these terminals extend out from the glass header and when a chip is placed thereon with the apertures as 50 and 51 filled with a conductive frit, the conductive frit will make direct contact with the extending terminals in 75 and 76. Also shown in FIG. 3A is a Kovar guiding pin 74. The pin 74 as will be explained, accesses an aperture in the chip to enable the chip always to be properly aligned with respect to the terminals of the glass header as terminals 72, 75 and so on. FIG. 3C also depicts the reference tube 17 of FIG. 1 which reference tube, of course, is associated with the sensor 25 in order to produce a gage output. Thus the sensor tube or reference tube 17 as shown in FIGS. 3A and 3C is also coupled to and extends into header 70 for measuring gage pressure as chip 49 of FIG. 2. The reference tube 17 as seen will communicate with aperture 59 shown in FIG. 2C and therefore allow a reference pressure to be applied to the chip when inserted in header or shell 18. As seen in FIGS. 3A, 3B and 3C, there is no chip inserted but the Figures merely show the header shell as 18 in FIG. 1 as well as the glass header 70 which is header 27 of FIG. 1. As indicated, FIG. 3 also shows a guide pin 74 whose function has been indicated above and will be further explained.

Referring now to FIG. 4 and FIG. 6, one can see in FIG. 6A a top view of the glass guiding plate 87. The guiding plate 87 has a central rectangular aperture 86 which exactly conforms to the shape of the rectangular chip. The guiding plate 87 has a guiding hole or aperture 85. The hole 85 co-acts with the pin 74 and therefore the guiding plate assures that the chip, when positioned within the rectangular aperture 86 will always be in the right position. The guiding plate depicted is made out of glass and is approximately 0.2 inches in diameter with a rectangular opening being 0.143 inches by 0.068 inches and as indicated is rectangular. Thus referring to FIG. 4A, it is noted that the same reference numerals have been utilized for a clearer understanding. Where indicated, the reference numerals also show the appropriate Figures used. In any event, as seen in FIG. 4A, the guiding plate 87 as shown in FIG. 6 is positioned over the glass header 70 as aperture 85 in the glass guiding plate of FIG. 6A is positioned over the guide pin 74. This is clearly shown in FIG. 4B. In any event, the entire chip as chip 40 is placed in the aperture 86 of the guiding plate. When in place in the aperture, contact is made with all contact pins as described above. This is basically shown in FIG. 4B where pins 75 and 76 will contact the appropriate contact terminals associated with the chip.

Referring to FIG. 5 there is shown again a cross-sectional view of the chip header 18 together with the sensor chip containing sensors 48 and 49 of FIG. 2 in place. One can see that contact is made with contact 71 and 72 as well as contact 75. There is also shown the reference tube 17 of FIG. 1 directed through the locking nut 16 and ferrule 15, also of FIG. 1. This shows basically the complete unit prior to placing the unit within the header 10 of FIG. 1. One can understand how simple the fabrication is, as for example, shown in FIG. 5. FIG. 5 essentially is a complete unit containing the absolute pressure sensor 48 and the differential pressure sensor 49, all of which are easily assembled as described, and are in perfect alignment because of the guiding glass 40 which is secured to the header glass 70. As one can ascertain, bonding between silicon and glass is well known and, for example, see the above noted U.S. Pat. No. 5,286,671 for such bonding techniques. The above noted patent is also incorporated herein by reference.

Referring to FIG. 7 there is shown an enlarged view of the sensor assembly depicting the guiding pin 74 together with sensors 48 and 49 all in place within the rectangular aperture 86 of the guiding glass plate 87. Thus, as one will ascertain from the above noted description, there is described a combined compact absolute and gage pressure transducer. The use of the guiding glass plate, which may be bonded to the glass header facilitates chip insertion and assures proper alignment in a rapid and efficient manner, thus saving a considerable amount of fabrication time which otherwise would have to be employed. The device because of the use of the leadless sensors, enables a compact operation to be provided due to the fact that there are no terminal leads associated with the sensor devices but merely contacts. The contacts contact the terminal pins associated with the glass header, thus a simple and easy construction is shown. It will become apparent to those skilled in the art that many alternative embodiments may be discerned, all of which are deemed to be encompassed within the spirit and scope of the claims appended hereto.

What is claimed is:

1. A pressure transducer, comprising:
   a housing having an internal hollow and having a first pressure port for receiving a first pressure ($P_1$) and a second pressure port for receiving a second pressure ($P_2$), said housing having a pressure sensor header accommodating area within said hollow,
   a pressure sensor header having an outer shell with a semiconductor sensor chip accommodated in said shell, said chip containing first and second pressure sensing modules fabricated from a common wafer process, each module containing contacts connected to said sensor module, said chip mounted on a glass header within said shell, said header having terminal pins connected to said module contacts,
   said glass header further including a guide pin extending from said header and positioned within said shell to properly align said chip when placed in said shell assuring that said module contacts and said terminal pins properly align to make electrical contact,
   said shell positioned within the hollow of said housing according to the location of said guide pin to enable said first and second pressure sensing modules to receive said first pressure, and
   means coupled to said second pressure port to direct said second pressure to only one of said modules to cause said module to provide an output proportional to the difference between said first and second pressure, with said other module providing an output proportional to said first pressure.

2. The pressure transducer according to claim 1 further including a guide plate having a chip guide aperture of the same shape as said chip to enable said chip to be placed in proper orientation in said chip guide aperture, said guide plate having a guide pin accommodating aperture adapted to receive said guide pin to properly align said chip when accommodated by said guide plate aperture.

3. The pressure transducer according to claim 2 wherein said guide plate is a glass plate and is positioned on a surface of said glass header.

4. The pressure transducer according to claim 1 when each sensor module has a diaphragm, each of said diaphragms having a sensor element position thereon, and each having a top surface for receiving said first pressure via said first pressure port and a tube directed form said second pressure port to said bottom surface of one of said diaphragms to cause said one sensor module to provide an output proportional to the difference between said first and second pressure, with said other sensor module providing an output proportional to said first pressure.

5. The pressure transducer according to claim 4 wherein said sensor elements are piezoresistors.

6. The pressure transducer according to claim 1 wherein said second pressure is atmospheric pressure and said difference in pressure is gage pressure.

7. The pressure transducer according to claim 1 wherein said semiconductor sensor chip is a leadless chip, said leadless chip comprising a central semiconductor layer having a top and bottom surface, having a first and second sensor positioned on said top surface, one on a right side of chip and the other on a left side, each sensor having a piezoresistive structure thereon and each fabricated from a common wafer, said semiconductor layer being of a selected geometrical shape, a cover member of said same geometrical shape bonded to said top surface of said layer and having a right and left aperture surrounding said right and left sensors, said right and left aperture of the same size and each to enable a pressure applied to be directed to said top surface of said layer, said piezoresistive structure having contact terminals on said bottom surface of said semiconductor layer,
   a contact layer of said geometrical shape bonded to said bottom surface of said semiconductor layer and having contact apertures aligned with said contact terminals, said apertures adapted to receive a conductive frit to enable electrical contact with said contact terminals of said semiconductor layer.

8. The pressure transducer according to claim 7 further including an isolation groove symmetrically positioned between said right and left sides, said groove formed in said cover member and through said semiconductor layer to isolate said right and left sides to thereby prevent current flow from said right side to said left said.

9. The pressure transducer according to claim 7 wherein said central semiconductor layer is silicon.

10. The pressure transducer according to claim 9 wherein said cover member is glass.

11. The pressure transducer according to claim 10 wherein said contact layer is glass.

12. The pressure transducer according to claim 1 wherein said geometrical shape is a rectangle.

13. The pressure transducer according to claim 7 wherein said constructive frit is a mixture of a glass frit and conductive metallic particles.

14. The pressure transducer according to claim 13 wherein said conductive particles are gold.

15. The pressure transducer according to claim 7 wherein said piezoresistive structures are piezoresistors in a Wheatstone bridge array.

16. The pressure transducer according to claim 10 wherein said cover member is fusion bonded to said semiconductor layer.

17. The pressure transducer according to claim 11 wherein said contact layer is fusion bonded to said semiconductor layer.

18. The pressure transducer according to claim 1 wherein said housing has a front cylindrical section with a rear hollow section and said pressure sensor header positioned in said rear hollow, said front cylindrical section having said first pressure port ($P_1$) communicating with a channel directed into said hollow and communicating with said first and second pressure port sensing modules to direct said first pressure ($P_1$) thereto, said second pressure ($P_2$) located on a side of said front section and communicating with a pressure tube, said pressure tube having an arcuate bend to position said tube to communicate with a differential input of one of said pressure sensing modules to cause said one module to provide an output indicated of $P_1$-$P_2$ with said other module providing an output indicative of $P_1$.

19. The pressure transducer according to claim 18 wherein $P_2$ is atmospheric pressure and therefore the difference between $P_1$ and $P_2$ is gage pressure.

20. The pressure transducer according to claim 18 wherein said housing is fabricated from a metal.

* * * * *